(12) United States Patent
Goad

(10) Patent No.: US 12,436,834 B2
(45) Date of Patent: Oct. 7, 2025

(54) AUTOMATED APPLICATION PROGRAMMING INTERFACE (API) ROUTE TESTING SYSTEM

(71) Applicant: Bank of America Corporation, Charlotte, NC (US)

(72) Inventor: Melissa Goad, Murphy, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/140,982

(22) Filed: Apr. 28, 2023

(65) Prior Publication Data

US 2023/0267030 A1      Aug. 24, 2023

Related U.S. Application Data

(63) Continuation of application No. 17/577,760, filed on Jan. 18, 2022, now Pat. No. 11,704,187.

(51) Int. Cl.
   G06F 11/07      (2006.01)
   G06F 9/54       (2006.01)

(52) U.S. Cl.
   CPC .............. *G06F 11/079* (2013.01); *G06F 9/54* (2013.01); *G06F 11/0721* (2013.01)

(58) Field of Classification Search
   CPC ....... G06F 11/079; G06F 11/0721; G06F 9/54
   See application file for complete search history.

(56) References Cited

U.S. PATENT DOCUMENTS

| 7,493,597  | B2  | 2/2009  | Hefner |
| 7,536,679  | B1* | 5/2009  | O'Connell .......... G06F 11/3684 714/39 |
| 8,443,381  | B2  | 5/2013  | Nagahara et al. |
| 9,311,224  | B1* | 4/2016  | Cohen ................. G06F 11/3684 |
| 9,720,746  | B2  | 8/2017  | Zhu et al. |
| 9,885,751  | B2  | 2/2018  | Rousseau et al. |
| 10,901,880 | B1  | 1/2021  | Bernard et al. |

(Continued)

OTHER PUBLICATIONS

Wikipedia's Peripheral Historical version published Nov. 9, 2021 https://en.wikipedia.org/w/index.php?title=Peripheral&oldid=1054357730 (Year: 2021).

(Continued)

*Primary Examiner* — Joseph O Schell
(74) *Attorney, Agent, or Firm* — Banner & Witcoff, Ltd.

(57) ABSTRACT

Various aspects of the disclosure relate to automated route testing for application programming interfaces (APIs). An API route testing systems is configured to use classes and methods to identify API routes called by APIs and routes made available by application services. The class methods are customizable based on a programming language, testing or development framework, and the application type. Instances of classes are provided to detect routes similarly to API functions incorporated into a client application. Classes also detect routes in use by client services. A separate class is provided to compare the lists of API called routes and routes used by client services to return a listing of duplicate routes, unused API routes and client calls to invalid API routes (e.g., missing routes). For found duplicate routes and missing routes, the API route testing system generates an indication of the error and lists routes causing the error.

20 Claims, 5 Drawing Sheets

(56) References Cited

U.S. PATENT DOCUMENTS

| | | | |
|---|---|---|---|
| 10,990,516 B1 | 4/2021 | Merritt | |
| 11,204,862 B2 | 12/2021 | Wang et al. | |
| 11,704,187 B1* | 7/2023 | Goad | G06F 11/079 |
| | | | 714/33 |
| 2017/0068613 A1 | 3/2017 | Edmonds | |
| 2017/0192881 A1 | 7/2017 | Kruglick | |
| 2018/0314622 A1 | 11/2018 | Lowe et al. | |
| 2020/0401506 A1 | 12/2020 | Sathianarayanan et al. | |
| 2021/0240600 A1* | 8/2021 | Larosa | G06F 11/3698 |
| 2024/0256364 A1 | 8/2024 | Ward et al. | |

OTHER PUBLICATIONS

Wikipedia's Computer Keyboard Historical version published Dec. 9, 2021 https://en.wikipedia.org/w/index.php?title=Computer keyboard &oldid=1059466143 (Year: 2021).

Wikipedia's Computer Monitor Historical version published Dec. 15, 2021 https://en.wikipedia.org/w/index.php?title=Computer monitor &oldid= 1060359332 (Year: 2021).

* cited by examiner

FIG. 4

AUTOMATED APPLICATION PROGRAMMING INTERFACE (API) ROUTE TESTING SYSTEM

CROSS REFERENCE TO RELATED APPLICATION(S)

This application is a continuation of and claims priority to U.S. patent application Ser. No. 17/577,760 entitled "Automated Application Programming Interface (API) Route Testing System" filed on Jan. 18, 2022, which is incorporated by reference in its entirety.

BACKGROUND

An application programming interface (API) enables communication and data exchange between different software systems. Client software systems may integrate API functions that facilitate communication between the different software systems via routes and endpoints.

Automated code testing is a best practice in modern application development to ensure both individual units of code and the integration of units of code are bug free and work as designed when integrated in a released software system. Automated code testing may include unit testing of individual modules, integration testing of combinations of modules, and functional testing of one or more functionalities of the software system. Unit testing is accomplished by running tests on units of code in isolation. Integration testing combines software units or modules to test their interaction. Routing is often indirectly tested as a byproduct of integration testing. For example, tests may be run on client code that include API calls may be used to indirectly validate the API routes as being valid and that the underlying API code has executed without error. However, these integration tests do not ensure all client referenced API routes are valid. As such, often APIs routes may not operate as intended when incorporated into client applications, causing potential instability and an increased risk that the API routing errors may be leveraged by malicious attackers.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure provide solutions that address and overcome technical problems associated with application programming interfaces. In particular, one or more aspects of the disclosure relate to identification of missing, duplication and unused application programming interface (API) routes used for communicating with applications.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes identification of missing, duplication and unused application programming interface (API) routes.

An API route testing system may be configured to use classes including methods to identify API routes, where the methods are customizable based on a programming language, testing or development framework, and the application type. The API route testing system does not validate client functionality or test API functionality. Rather, the API route testing system detects differences between a client's API calls and the actual API routes. Classes are provided to detect routes as if as called by API functions incorporated into a client application and to detect routes in use by client services. A separate class is provided to compare the lists of API called routes and routes used by client services to return a listing of duplicate routes, unused API routes and client calls to invalid API routes (e.g., missing routes). If duplicate routes and missing routes are found, then the API route testing system generates an indication of the error and list routes causing the error. In some cases, an API call associated with the route causing an error may also be provided. Optionally, unused routes may be output as an error so that the associated code may be removed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 show an illustrative process for API route testing, in accordance with one or more example arrangements; and FIG. 4 shows an illustrative example of pseudo code incorporating the illustrative classes for API route testing in accordance with one or more aspects described herein.

DETAILED DESCRIPTION

Figure 1A:
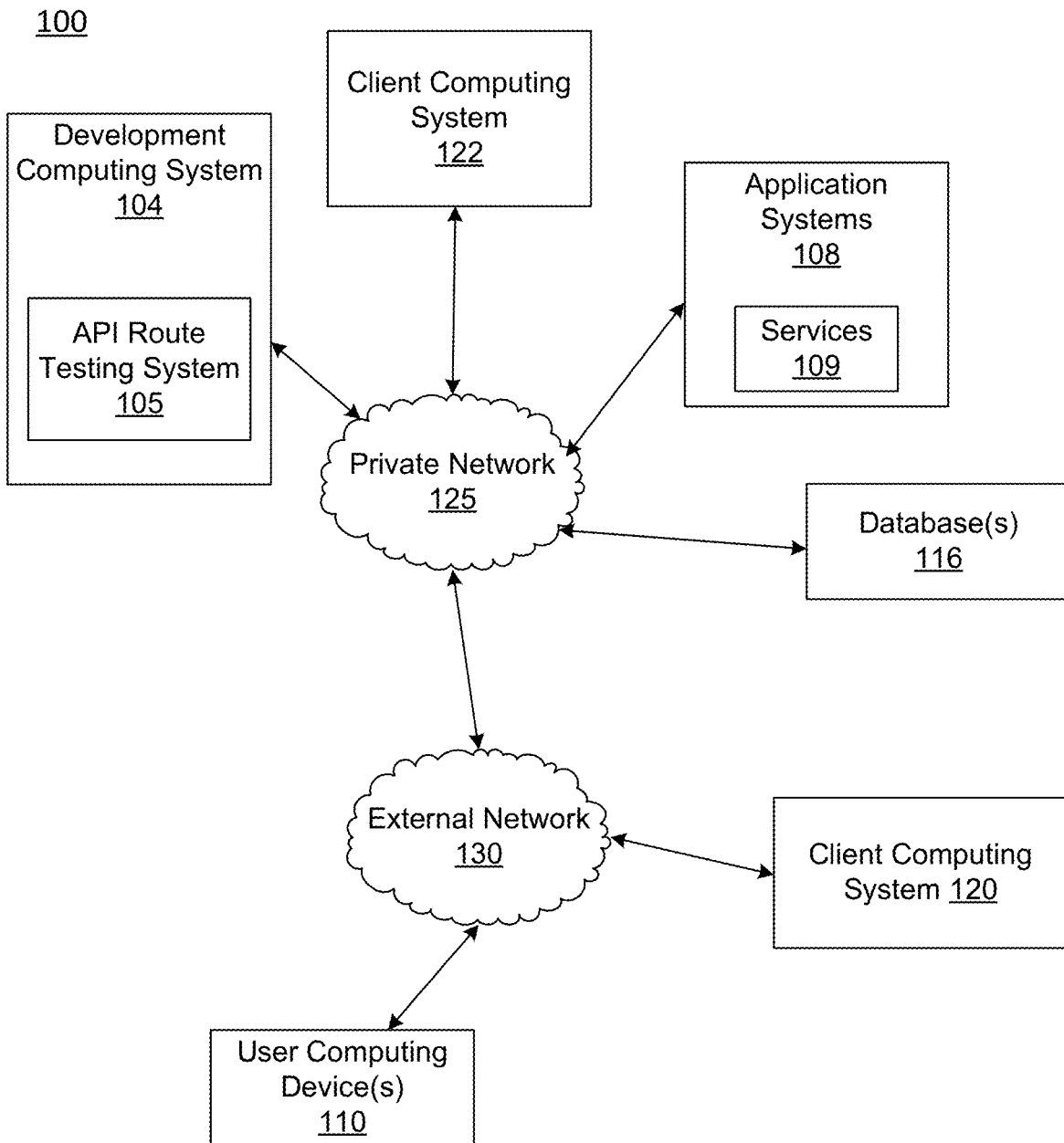
FIG. 1A shows an illustrative computing environment for development and testing of software applications and related application programming interfaces, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Automated code testing is a best practice in modern application development to ensure both individual units of code and the integration of units of code are bug free and work as designed. Often, application programming interface calls are not running tests on client code that include API calls indirectly validates that the API routes are valid, and the underlying API code is executed without error. However, these integration tests do not ensure all client referenced API routes are valid. The API route testing system, as described herein, may detect duplicate API routes, identify unused API routes, and discover client calls to invalid API routes. In doing so, the API route testing system allows code base that are easily testable, which reduces code-based risk to enterprise organizations, improves stability of software-based products and services, and reduces risk of malicious actors leveraging API call defects to attack enterprise computing system. Additionally, by appropriately testing that API code is executed without error, by integrating the API route testing system into a software development and/or testing computing system, potential security vulnerabilities may be mitigated to improve the information security of the enterprise organization computing system and, in turn, maintain a reputational health of the enterprise organization.

FIG. 1A shows an illustrative computing environment for development and testing of software applications and related application programming interfaces, in accordance with one or more aspects described herein.

Figure 1B:
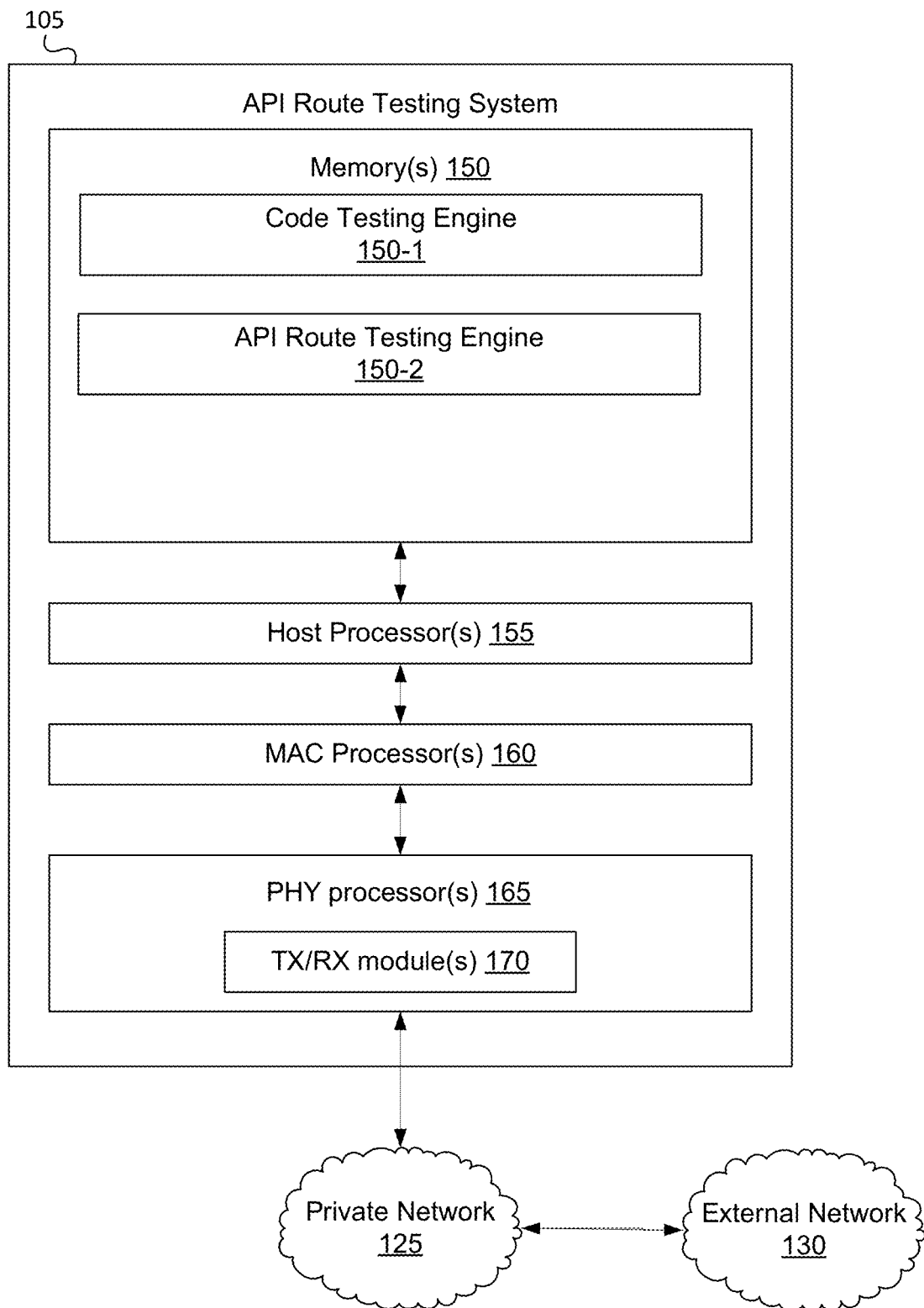
FIG. 1B shows an illustrative computing platform enabled for development and testing of software applications and related application programming interfaces, in accordance with one or more aspects described herein.

FIG. 1B shows an illustrative computing platform enabled for development and testing of software applications and related application programming interfaces, in accordance with one or more aspects described herein.

FIG. 1A shows an illustrative computing environment 100 for API route testing, in accordance with one or more arrangements. The computing environment 100 may comprise one or more devices (e.g., computer systems, communication devices, and the like). The computing environment 100 may comprise, for example, a development computing system 104, one or more application system 108, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the API route testing system 105 as being incorporated within the development computing system 104, the API route testing system may be implemented as a separate computing system.

The development computing system 104 may comprise one or more computing devices and/or other computer components (e.g., processors, memories, communication interfaces) configured to perform one or more functions as described herein, such as and including the API route testing system 105. Further details associated with the architecture of the API route testing system 105 are described with reference to FIG. 1B.

The application system 108 and/or the client system 122 may comprise one or more computing devices and/or other computer components (e.g., processors, memories, communication interfaces). In addition, the application system 108 and/or the client system 122 may be configured to host, execute, and/or otherwise provide one or more enterprise applications. In some cases, the application systems 108 may host one or more services 109 configured facilitate operations requested through one or more API calls, such as data retrieval and/or initiating processing of specified functionality. In some cases, the client computing system 122 may be configured to communicate with one or more of the application systems 108 via API function calls and the services 109. In an arrangement where the private network 125 is associated with a financial institution (e.g., a bank), the application systems 108 may be configured, for example, to host, execute, and/or otherwise provide one or more transaction processing programs, such as an online banking application, fund transfer applications, and/or other programs associated with the financial institution. The client computing system 122 and/or the application systems 108 may comprise various servers and/or databases that store and/or otherwise maintain account information, such as financial account information including account balances, transaction history, account owner information, and/or other information. In addition, the client computing system 122 and/or the application systems 108 may process and/or otherwise execute transactions on specific accounts based on commands and/or other information received from other computer systems comprising the computing environment 100. In some cases, one or more of the client computing system 122 and/or the application systems 108 may be configured, for example, to host, execute, and/or otherwise provide one or more transaction processing programs, such as electronic fund transfer applications, online loan processing applications, and/or other programs associated with the financial institution.

The application systems 108 may be one or more host devices (e.g., a workstation, a server, and the like) or mobile computing devices (e.g., smartphone, tablet). In addition, an application systems 108 may be linked to and/or operated by a specific enterprise user (who may, for example, be an employee or other affiliate of the enterprise organization) who may have administrative privileges to perform various operations within the private network 125. In some cases, the application system 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces). The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system 120 is for processing an electronic exchange of goods and/or services. The client computing system 120 may be associated with a specific goods purchasing activity, such as purchasing a vehicle, transferring title of real estate may perform communicate with one or more other platforms within the client computing system 120. In some cases, the client computing system 120 may integrate API calls to request data, initiate functionality, or otherwise communicate with the one or more application systems 108, such as via the services 109. For example, the services 109 may be configured to facilitate data communications (e.g., data gathering functions, data writing functions, and the like) between the client computing system 120 and the one or more application systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the API route testing system 105. For example, the database(s) 116 may store API code of an API to be tested, API test classes, and the like. In an arrangement, the database(s) 116 may be used for other purposes as described herein. In some cases, the client computing system 120 may call one or more API functions to write data or read data to the database(s) 116 via the services.

In one or more arrangements, the development computing system 104, the API route testing system 105, the application systems 108, the client computing system 122, the user the client computing system 120, the user devices 110, and/or the other devices/systems in the computing environment 100 may be any type of computing device capable of receiving input via a user interface, and communicating the received input to one or more other computing devices in the computing environment 100. For example, the development computing system 104, the API route testing system 105, the application systems 108, the client computing system 122, the user the client computing system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the development computing system 104, the API route testing system 105, the application systems 108, the client computing system 122, the user the client computing system 120, the user devices 110, and/or the other devices/systems in the computing environment 100 may, in some instances, be and/or comprise special-purpose computing devices configured to perform specific functions.

FIG. 1B shows an example API Route Testing System 105 in accordance with one or more examples described herein. The API Route Testing System 105 may be a stand-alone device and/or may at least be partial integrated with the development computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The API Route Testing System 105 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the API Route Testing System 105 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165.

The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the API Route Testing System 105 may be configured to execute machine readable instructions stored in memory 150. The memory 150 may comprise (i) one or more program modules/engines having instructions that when executed by the one or more processors cause the API Route Testing System 105 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the API Route Testing System 105 and/or by different computing devices that may form and/or otherwise make up the API Route Testing System 105. For example, the memory 150 may have, store, and/or comprise a code testing engine 150-1, an API route testing engine 150-2, and/or the like. The code testing engine 150-1 may have instructions that direct and/or cause the API route testing system 105 to perform one or more operations associated with developing and/or testing of software, such as a software development framework and/or a software testing suite configured for testing software written in one or more coding languages such as C, C++, C#, Java, and the like. The API route testing engine 150-2 may have instructions that may cause the API route testing system 105 to perform tests of API functions, such as to identify invalid, duplicate, and/or unused routes, and to provide output identifying the same.

While FIG. 1A illustrates the development computing system 104, the API route testing system 105, and/or the application systems 108, as being separate elements connected in the private network 125, in one or more other arrangements, functions of one or more of the above may be integrated in a single device/network of devices. For example, elements in the API route testing system 105 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the development computing system 104, and/or the application systems 108.

Figure 2:
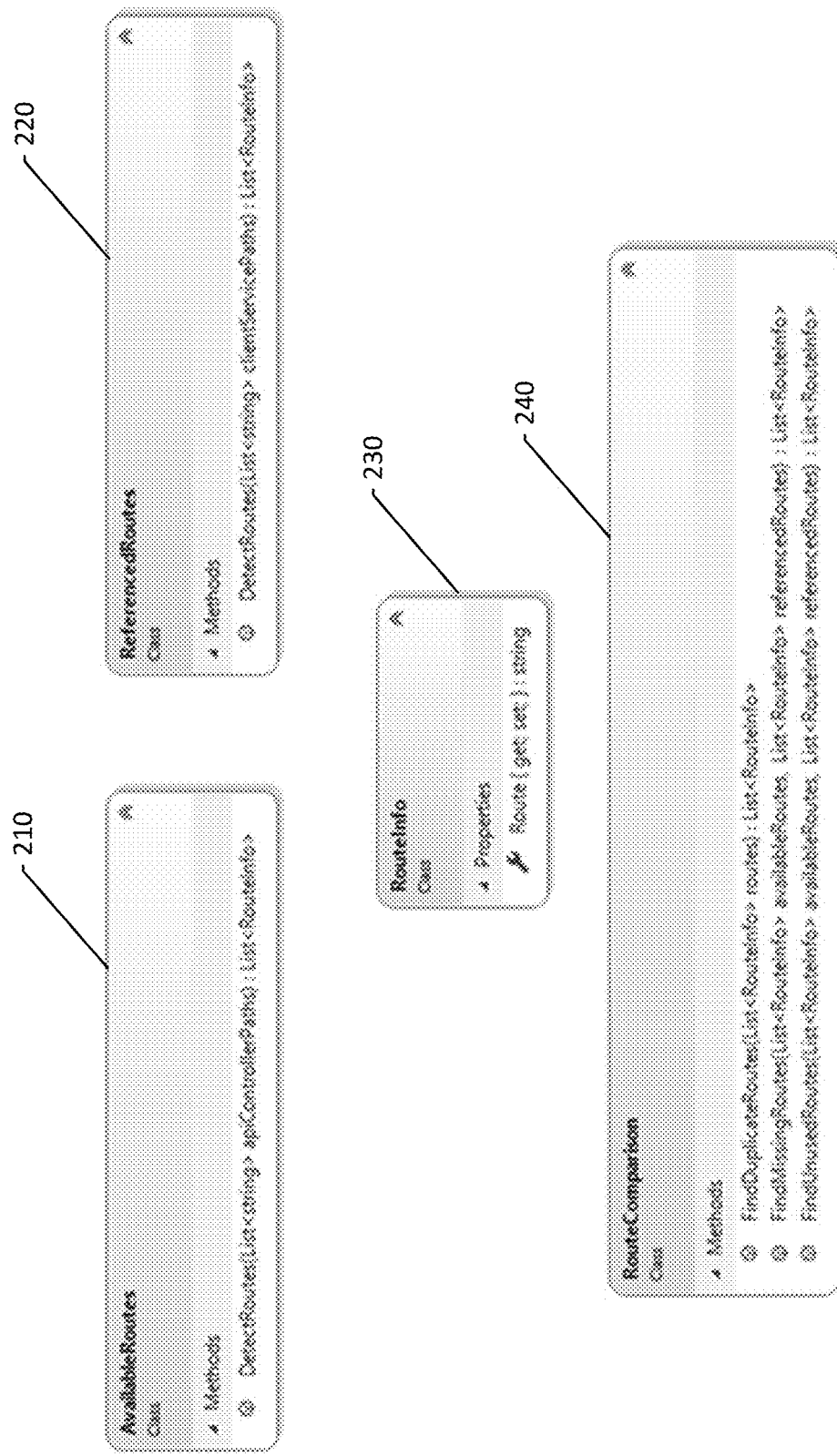
FIG. 2 shows illustrative classes for API route testing in accordance with one or more aspects described herein.
Figure 2:
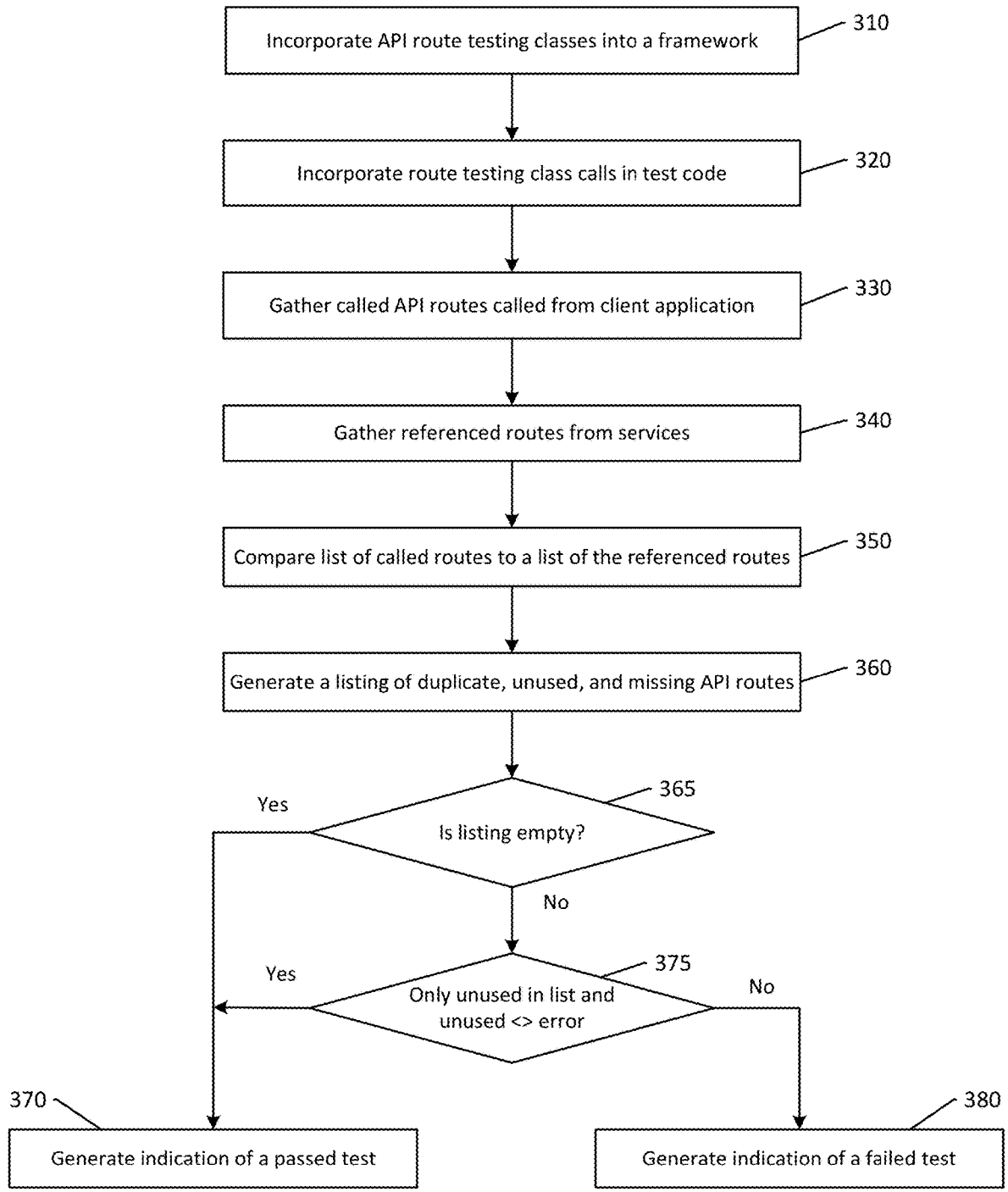

FIG. 2 shows illustrative classes for API route testing in accordance with one or more aspects described herein. The API route testing system 105 may be configured to directly test API routing in an application, such as by allow a developer or other to automate testing of the API routing on the developer system 104 configured with an API route testing system 105 within the developer framework and/or testing framework. In some cases, the API route testing system 105 may allow for simplified simulation and direct testing of API routes. A goal of such testing may be to ensure all routes used by client services exist, that the API does not contain duplicate routes, and/or to detect one or more API routes not in use by the client services. By detecting client API calls to invalid routes and duplicate API routes, the resulting information identifies defects that may be inadvertently incorporated into the applications calling the API and/or may identify defects in the applications from which data has been requested. In some cases, detected unused API routes may identify areas for code refactoring, which results in improved maintenance and/or improved performance due to a reduced-size code base.

FIG. 2 shows illustrative classes as may be incorporated into a development framework, such as a C#development framework. An AvailableRoutes class 210 may include one or more methods such as a DetectRoutes method. The DetectRoutes method accepts a list of paths to various API controller classes. The implementation of the DetectRoutes method may be coded in such a way to focus the implementation of detecting the routes for each controller, so that the method may operate based on the API's implementation and/or structure.

A ReferencedRoutes class 220 may include one or more methods such as a DetectRoutes method. The DetectRoutes method accepts a list of paths to the various client services that make calls to the API. The implementation of the DetectRoutes method may be coded in such a way to focus the implementation of detecting the routes for each controller, so that the method may operate based on the API's implementation and/or structure.

A data class, e.g., a RouteInfo class 230, may contain properties to identify and track each route detected by the AvailableRoutes class 210 and the ReferencedRoutes class 220. At a minimum, the RouteInfo class 300 includes the API route (e.g., a string variable), which will be used for comparisons. The RouteInfo class 230 can be extended or otherwise customized based on the API structure and/or information desired to produce helpful test results.

A RouteComparison class 240 may include three methods, such as a method for detecting missing routes (e.g., a FindMissingRoutes method), a method for detecting unused routes (e.g., a FindUnusedRoutes method), and a method for detecting duplicate routes (e.g., a FindDuplicateRoutes method). Each of the FindMissingRoutes method, the FindUnusedRoutes method, and the FindDuplicateRoutes method may input a list of routes from one or both of the API and from the client. For example, the RouteComparison class 240 may return a list of results of a comparison of a list of available routes identified via use of the AvailableRoutes class 210 to a list of referenced routes identified via use of the ReferencedRoutes class 220. The implementation of this strategy depends on the client and API. Not all RouteComparison methods must be used. For example, an application may accept unused routes and choose not to write a test to detect for these occurrences.

In some cases, testing results may be seen via a graphical user interface included with a development framework, may be provided via a custom generated user interface, and/or may be communicated via the private network 125 to be displayed on a user device. In some cases, a configuration interface may be presented to the user to enable or disable an error notification listing unused routes. In some cases, a user interface may receive an input enabling an error condition based on whether unused routes are identified. If indicated, error conditions (e.g., missing route errors, duplicate route errors, unused routes errors) may be displayed via a user interface on a user system, either local to the development system or on a separate user device. In some cases, error handling user interface screens may include a listing of errors, a listing of routes associated with each individual error, and, in some cases, an indication of code associated with the errors.

FIG. 3 show an illustrative process for API route testing, in accordance with one or more example arrangements. At 310, a developer may incorporate the API route testing classes into a development framework and/or a testing framework. In some cases, the API route testing classes may be customized based on the API structure and/or the programming language used. At 320, the route testing calls may be incorporated into test code to facilitate testing of the API route calls, either separately testing the API or testing an application associated with the API. At 330, the DetectRoutes method of the AvailableRoutes class 210 may be called to rretrieve a list of all available API routes. At 340, the DetectRoutes method of the ReferencedRoutes class 220 may be called to retrieve a list of all API routes references by the client services.

To test routing of the API calls, the API route testing system 105 may compare routes referenced in the client and available API routes at 350. For example, a list of duplicate, unused, and missing API routes may be generated at 360. For example, the API route testing system 105 may retrieve a list of duplicate API routes by calling RouteComparison. FindDuplicateRoutes. If the list contains any routes, a test failure may be caused. The API route testing system 105 may retrieve a list of client API references that do not exist in the API by calling RouteComparison. FindMissingRoutes. If the list contains any routes, the test may fail. The API route testing system 105 may retrieve a list of API routes not referenced in the client services by calling RouteComparison.FindUnusedRoutes. Optionally, the test may fail if this list contains any routes.

At 365, the API route testing system 105 may determine whether the lists are empty. If so, the test completes successfully at 370. For example, an output may be caused to be generated within the development framework, at a remote user interface, or other such visual or audio output representative of a passed test.

If, at 365 the listing was not empty, then the API route testing system 105 may determine at 375 whether unused routes are configured to cause an error and whether only unused routes are included in the list of routes. If so, the test may complete successfully at 370. If, at 375, the API route testing system 105 is configured to output an error if unused routes are found and/or if the lists contain duplicate or missing routes, the API route testing system may output an error at 380. For example, an output may be caused to be generated within the development framework, at a remote user interface, or other such visual or audio output representative of a failed test. In some cases, the output may contain route names, an identification of whether one or more of unused routes, missing routes or duplicate routes were found, and/or the like.

A variety of strategies exist to test APIs including strategies to test the underlying controller methods. However, testing the underlying controller methods is often unnecessary because most API controllers delegate work to separate underlying services, such as services 108. Another existing API test strategy may involve using reflection to find API routes and then writing helper classes to create an HTTP context that execute API calls within tests. However, such reflection-based strategies either fall short of being useful or introduce unneeded and unnecessary complexity into the testing process. These methods also both fail to detect unused routes and, therefore, unused code that could be removed, such as to improve performance. Additionally, neither of the above mentioned existing approaches will detect the client API calls that will result in error responses, such as bad requests or not found responses. The API route testing system 105 described herein, and the classes described with respect to FIG. 2, are unique because the API route testing system 105 does not have focus on validating client functionality or attempting to test API functionality. Instead, API route testing system 105 focuses on detecting differences between a client's API calls and the actual API routes.

While the illustrative pseudo code shown in FIG. 4 is representative of code written in C#and used in a test framework. The design is not dependent on a specific language or framework, and any can be substituted. Because the API route testing system 105 is language agnostic and includes an open implementation format to customize detection of routes in the API and client services, the API route testing system 105 allows for this API route test strategy to be implemented without regard to the client structure, API structure and/or language.

One or more aspects of the disclosure may be embodied in computer-usable data or computer-executable instructions, such as in one or more program modules, executed by one or more computers or other devices to perform the operations described herein.

Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media a storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An application programming interface (API) route testing platform, comprising:
    at least one processor; and
    memory storing computer-readable instructions that, when executed by the at least one processor, cause the API route testing platform to:
        process a plurality of API route testing function calls received from a test application, wherein each of the plurality of API function are integrated in an application under test;
        generate, based on the plurality of API route testing function calls received from a host computing device processing the application under test and via a network, a first list of available routes, wherein the API route testing function calls identify and track each route processed by the application;
        generate, based on the plurality of API route testing function calls received, a second list of routes to API controller classes that were requested via API calls from the test application;
        identify, based on a comparison of the first list of available routes to the second list of routes to various API controller classes, whether erroneous routes exist; and
        initiate, based on an indication that erroneous routes exist and at a remote device, a test failure response comprising an alert listing an identification of whether one or more of unused routes, missing routes, and duplicate routes were found.

2. The API route testing platform of claim 1, wherein the instructions cause the API route testing platform to compare the first list of available routes to the second list of routes to various API controller classes.

3. The API route testing platform of claim 2, wherein an erroneous route comprises a duplicate route referenced by the API.

4. The API route testing platform of claim 2, an erroneous route comprises a missing route that was referenced by the API.

5. The API route testing platform of claim 1, wherein an erroneous route comprises a route that was unused by the API.

6. The API route testing platform of claim 5, wherein the instructions cause the API route testing platform to:
    receive, via a first user interface device, an input configuring an error condition based on whether unused routes are identified; and
    generate, via a second user interface device, a visual representation of the route that was unused by the API.

7. The API route testing platform of claim 6, wherein the instructions cause the API route testing platform to generate, via the second user interface device, an indication of code associated with the route that was unused by the API.

8. A method comprising:
    processing a plurality of API route testing function calls received from a test application, wherein each of the plurality of API function are integrated in an application under test;
    generating, based on the plurality of API route testing function calls received by an API route testing platform and from a host computing device processing the application under test and via a network, a list of routes to API controller classes that were requested via API calls, wherein the API route testing function calls identify and track each route processed by the application;
    identifying, based on a comparison a list of available routes to the list of routes to API controller classes, whether erroneous routes exist;
    initiating, by the API route testing platform and based on an indication that erroneous routes exist and at a remote device, a test failure response comprising an alert listing an identification of whether one or more of unused routes, missing routes, and duplicate routes were found;
    receiving, by the API route testing platform via a first user interface device, an input configuring an error condition based on whether unused routes are identified; and
    generating, by the API route testing platform via a second user interface device, a visual representation of the route that was unused by the API.

9. The method of claim 8, further comprising comparing the list of available routes to the list of routes to API controller classes.

10. The method of claim 8, wherein an erroneous route comprises a duplicate route referenced by the API.

11. The method of claim 8, wherein an erroneous route comprises a missing route that was referenced by the API.

12. The method of claim 8, wherein an erroneous route comprises a route that was unused by the API.

13. The method of claim 12, further comprising:
    receiving, via a first user interface device, an input configuring an error condition based on whether unused routes are identified; and
    generating, via a second user interface device, a visual representation of the route that was unused by the API.

14. The method of claim 13, further comprising generating, via the second user interface device, an indication of code associated with the route that was unused by the API.

15. A system comprising:
    a host computing device hosting at least one service providing an API route facilitating communication via API function calls;
    an API route testing platform, comprising:
        at least one processor; and
        memory storing computer-readable instructions that, when executed by the at least one processor, cause the API route testing platform to:

process a plurality of API route testing function calls received from a test application, wherein each of the plurality of API function are integrated in an application under test;

generate, based on the plurality of API route testing function calls received, a list of routes to API controller classes that were requested via API calls, wherein the API route testing function calls identify and track each route processed by the application;

identify, based on a comparison of the list of routes to API controller classes to a list of available routes provided by the host computing device, whether erroneous routes exist; and initiate, based on an indication that erroneous routes exist, a test failure response exist and at a remote device, a test failure response comprising an alert listing an identification of whether one or more of unused routes, missing routes, and duplicate routes were found.

16. The system of claim 15, wherein the instructions cause the API route testing platform to compare the list of available routes to the list of routes to API controller classes.

17. The system of claim 16, wherein an erroneous route comprises a duplicate route referenced by the API.

18. The system of claim 16, an erroneous route comprises a missing route that was referenced by the API.

19. The system of claim 15, wherein an erroneous route comprises a route that was unused by the API.

20. The system of claim 19, wherein the instructions cause the API route testing platform to:

receive, via a first user interface device, an input configuring an error condition based on whether unused routes are identified; and generate, via a second user interface device, a visual representation of the route that was unused by the API.

* * * * *